US006216062B1

(12) United States Patent
Cwik et al.

(10) Patent No.: US 6,216,062 B1
(45) Date of Patent: Apr. 10, 2001

(54) STEP-LESS VEHICLE DISPLAY ALLOWING IRREGULAR UPDATE INTERVALS

(75) Inventors: Terry Thomas Cwik, Salem; Jeffrey Todd Kanoza, Troy; John Edward Schnoes, Plymouth, all of MI (US); Richard Stanley Smith, Eynsford (GB)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/438,352

(22) Filed: Nov. 11, 1999

(51) Int. Cl.[7] .................................................. G01F 34/08

(52) U.S. Cl. ............................... 701/1; 701/35; 340/43.8; 324/115; 324/166; 364/550

(58) Field of Search ......................... 701/1, 35; 364/565, 364/550; 340/438; 324/115, 166, 114

(56) References Cited

U.S. PATENT DOCUMENTS

| | | | | |
|---|---|---|---|---|
| 4,281,388 | | 7/1981 | Friend et al. | 364/565 |
| 4,779,213 | * | 10/1988 | Luitje | 364/565 |
| 4,939,675 | * | 7/1990 | Luitje | 364/550 |
| 5,040,412 | * | 8/1991 | Wannenwetsch | 73/116 |
| 5,214,793 | * | 5/1993 | Conway et al. | 455/49.1 |
| 5,325,082 | * | 6/1994 | Rodriguez | 340/438 |
| 5,357,451 | * | 10/1994 | Beaudry et al. | 364/561 |
| 5,561,374 | * | 10/1996 | Russ | 324/166 |
| 5,740,548 | * | 4/1998 | Hudgens | 701/35 |

* cited by examiner

*Primary Examiner*—William A. Cuchlinski, Jr.
*Assistant Examiner*—Tuan C. To
(74) *Attorney, Agent, or Firm*—Quarles & Brady

(57) ABSTRACT

A display system for vehicle data provides a smooth and responsive display of vehicle data even when the data is transmitted on an irregular basis by extrapolating from the previously received data when data is not received in a given interval. The invention allows display data to be preempted by higher priority data in a shared communications system.

20 Claims, 3 Drawing Sheets

FIG. 1
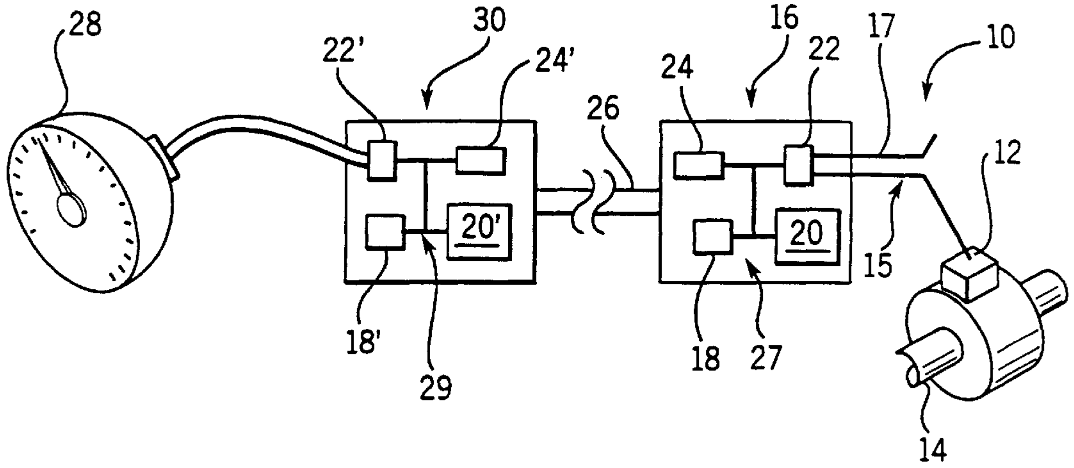
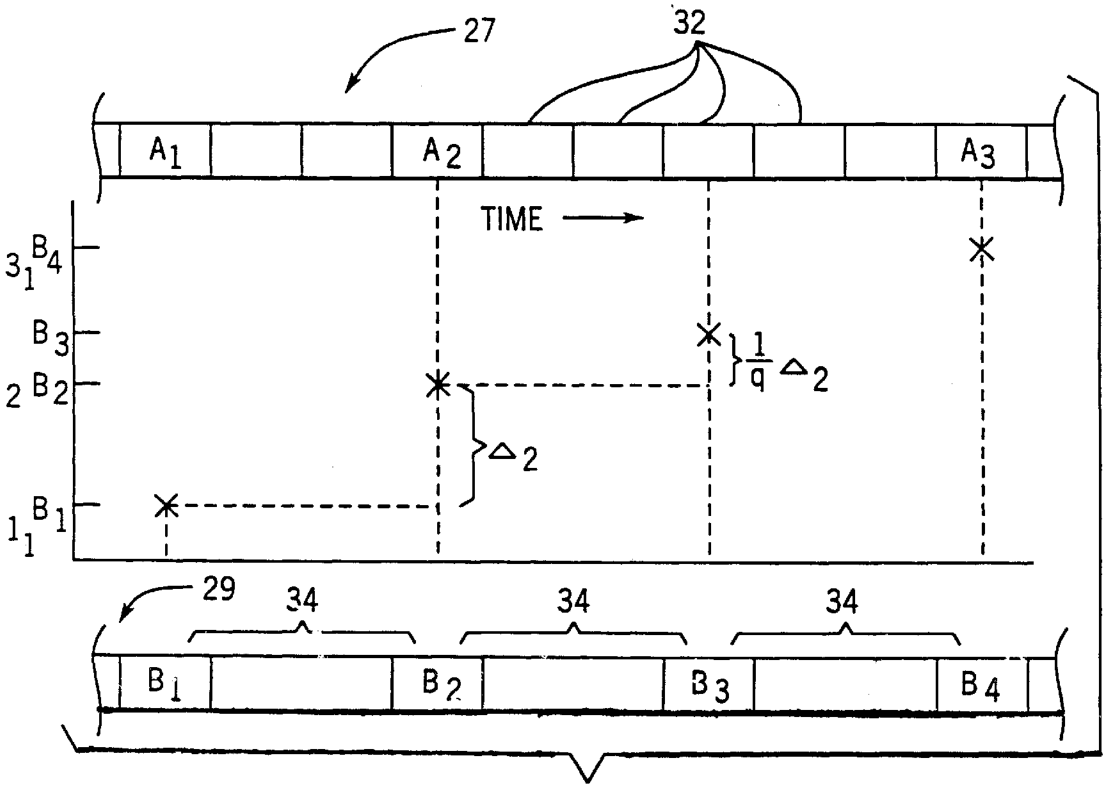
FIG. 2

STEP-LESS VEHICLE DISPLAY ALLOWING IRREGULAR UPDATE INTERVALS

BACKGROUND OF THE INVENTION

The present invention relates to vehicle instrumentation including speedometers and tachometers, and in particular to a display system allowing for the smooth display of changing but irregularly transmitted data.

Driver display data that was once transmitted as analog voltages (e.g., fuel level) or mechanically (e.g., road speed) is now transmitted as digital words in serial fashion on a digital communications network within the vehicle. The digital words representing data from different sources may be interleaved to be transmitted on a single cable ("time multiplexed") thereby substantially reducing wiring weight and costs. Display devices may be attached to this network to receive and display data related to their function. Such displays may include those providing numeric outputs ("digital displays") or those having a moving pointer ("analog displays").

Efficiencies in circuitry may be obtained if several vehicle sensors communicate with a single network interface card. The interface card converts data from the sensors to the proper format for transmission on the network and handles the necessary network protocols.

Often a network interface card will process both engine control data such as that from oxygen, air mass and fuel flow sensors, as well as driver display information from speedometer and tachometer senders. During certain times of rapidly changing engine conditions, such as during acceleration, the transmission of higher priority engine control data may interfere with the regular transmission of driver display information. This can result in a "stepping" or jerkiness in the operations of displays such as the speedometer or tachometer, which are also receiving rapidly changing data.

BRIEF SUMMARY OF THE INVENTION

The present invention provides a method of sending display data on an irregular interval without producing steps or jumps in the resultant display. This allows display data to be easily integrated with higher priority data on a common network interface. In the invention, if a digital word is not received within the regular interval, the display uses an extrapolated value based on the previously received digital word plus a fraction of the difference between the last two previously received digital words. The extrapolated digital word prevents sudden jumps in the display at limes when the displayed value is rapidly changing. Because, the extrapolation uses a simple fixed fraction of the difference between previously received digital word values, it does not require a recording of the time at which the previous digital words arrived or complex calculations such as would be required for linear extrapolation techniques.

Specifically then, the present invention provides a display system for use with a time-multiplexed digital communication network. The system includes a data sender attached to the network and associated with a physical object such as a rotating shaft to communicate on the network on an irregular interval, a series of first digital words representing a measurement of the physical object. A data receiver receive, the digital words on the irregular interval and produces second digital words on a periodic interval, the second digital words having values extrapolated from the first digital words. A display system receives the second digital words and provides a human readable display of the data of the second digital words.

It is thus one object of the invention to provide a display system that may accommodate irregular transmission rates inherent in the efficient use of network communication resources.

The extrapolation may extrapolate a current second digital word from the first digital word by calculating a difference between a previous first digital word prior to the current second digital word and a preceding first digital word prior to the previous first digital word. The current second digital word may be set to a value equal to the sum of a portion of the difference and the previous first digital word.

Thus it is another object of the invention to provide an extrapolation method that does not require recording times of receipt of the digital words or complex arithmetic operations necessary for true linear extrapolation.

The receiver may include a timer generating a periodic interrupt signal and a microprocessor responding to the periodic interrupt signal to extrapolate a current second digital word.

Thus it is another object of the invention to provide a simple method of producing a regular periodic series of digital words to the display unit such as may prevent perceivable stepping in the display.

The data receiver may further provide a filtering of the rate of change with time of the second digital words prior to their receipt by the display system. This may be done, for example, by creating a series of current filtered second digital words, each current filtered second digital word equal to the sum of a current second digital word times $1/m$ plus a previous filtered second digital word prior to the current filtered second digital word times $(m-1)/m$ where m is an arbitrary factor controlling the amount of filtering.

Thus it is another object of the invention to provide flexible adjustment in the trade-off between elimination of jumps in the display and fast response of the display to changes in the displayed data. Adjustment of the filter constant m controls the amount of filtering.

A subsequent filtering stage may be provided in which a set of twice filtered second digital words are created, each current twice filtered second digital word equal to the sum of a current filtered second digital word time, $1/n$ and a previous twice filtered second digital word prior to the current filtered second digital word times $(n-1)/n$ where n is an arbitrary factor independent of m controlling the amount of filtering. Further, a series of blended filtered second digital words may be created, each being a combination in a predetermined proportion of the current filtered second digital word minus the current twice-filtered second digital word.

Thus it is another object of the invention to provide a filter that allows control of overshoot as is represented by the second filtered digital words.

The foregoing and other objects and advantages of the invention will appear from the following description. In the description, reference is made to the accompanying drawings, which form a part hereof, and in which there is shown by way of illustration a preferred embodiment of the invention. Such embodiment does not necessary represent the full scope of the invention, however, and reference must be made to the claims herein for interpreting the scope of the invention.

BRIEF DESCRIPTION OF THE DRAWINGS

FIG. 1 is a simplified block diagram of the display system of the present invention having a data sender communicating with a network interface sending data over a multiplexed communication network to a second network interface attached to a display;

FIG. 2 is a set of graphs, the top graph showing the timing of transmission of first data from the sender of FIG. 1, the middle graph showing the values of the first data as a function of time, and the bottom graph showing a second set of digital words extrapolated from the first set of digital words according to the present invention;

DETAILED DESCRIPTION OF THE INVENTION

Figure 3:
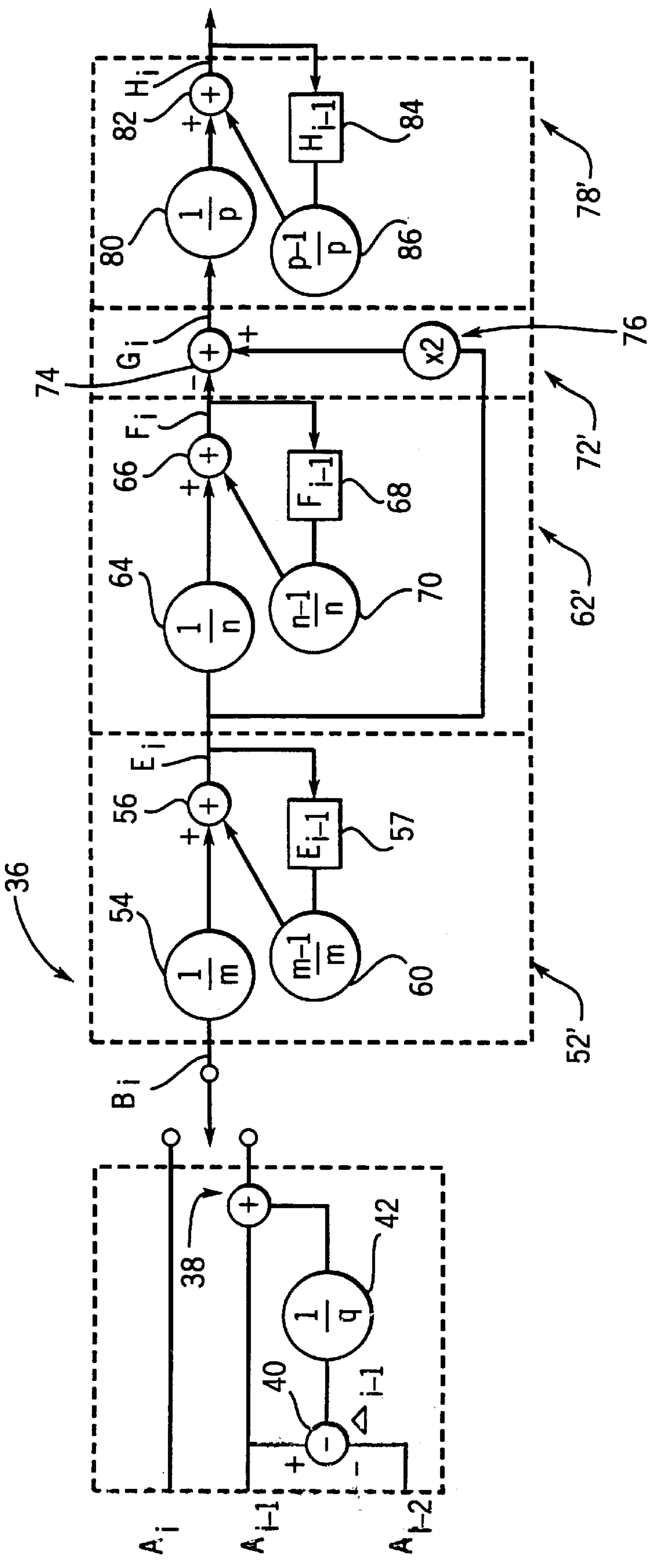
FIG. 3 is a function block diagram showing operation of the present invention on the first digital words of FIG. 2 to produce the second digital words of FIG. 2 as may be realized by discrete circuitry.

Referring now to FIG. 1, a display system 10 may include a sender module 12 such as a rotation counter attached to a physical element of the vehicle 14 such as an axle or drive shaft to make measurements of that physical object. While the present invention contemplates use with speedometers and tachometers, it will be understood that it is not limited to these devices but may be used with any display requiring fast response and step-less operation.

The sender module 12 may periodically supply first data 15 indicating the sensed quantity (e.g., road speed or engine rpm) to a network module 16 via input/output ("I/O") circuitry on the network module 16. The I/O circuitry 22 of the network module 16 may also receive data words 17 related to higher priority engine control functions or the like and may provide outputs to transmit data to actuators or other devices (not shown).

The network module 16 may provide some additional processing of the first data 15 (including the conversion of count information to rate information in some cases) and a formatting of the digital word for transmission on network cable 26 according to predetermined network protocols, for example, the CAN protocol specified in ISO document ISO/TC22/SC3WG1, thus creating the first digital word 27 from the first data. Because the network cable 26 serves as a common communication path for many sensors and actuators whose digital words are interleaved in time multiplexing, the protocol associates a header or unique time slot to each first digital word 27 indicating the consumer of the first digital word 27, in this case, ultimately a display 28.

As well as the I/O circuitry 22, the network module 16 may include a processor 18, a memory 20 for holding a stored program, receiving the first data 15 and network interface circuitry 24 all as are generally understood in the art.

The display 28 may receive data from a second network module 30 having components 22', 20', 18' and 24' similar to like numbered components in network module 16. The network module 30 receives the first digital words 27 off of the network cable 26 and processes them according to a stored program held in memory 20' as executed by processor 18' to produce new digital words 29 as will be described. The I/O interface 22' then converts digital words 29 produced by the processor 18 to a form appropriate for driving a display 28, for example, an analog waveform for driving a coil movement or pulses for driving a stepper motor.

Referring now to FIG. 2, the first digital words 27 (represented as values $A_i$) are interleaved with other digital words in separate transmission frames 32 to multiplex the bandwidth of the network cable 26 among many devices transmitting data. The digital words 27 will, in general, have a lower priority than other data and thus may be allocated to given frames 32 separated by an irregular interval. Thus as depicted, digital word $A_1$ is transmitted three frames prior to $A_2$, which is six frames prior to the transmission of $A_3$.

As mentioned above, this irregular transmission may result from preemption by higher priority data such as data related to engine control.

Referring still to FIG. 2, the network module 30 creates a second set of digital words 29 (represented as values $B_i$) occurring on a regular, periodic interval 34. Although $A_1$ and $B_1$ and $A_2$ and $B_2$ are shown aligned, in fact they are typically asynchronous. As will be described further below, the values $B_i$ are set equal to the values of $A_i$ occurring in the immediate prior interval 34 if a value of $A_i$ does occur during that interval. Thus in the example shown, $B_1$ takes the value of $A_1$ and $B_2$ takes the value of $A_2$. Importantly, however, if a digital word $A_i$ does not occur in the interval 34 preceding a particular digital word $B_i$, (for example, as occurs for $B_3$), the present invention synthesizes a value for $B_i$ based on the preceding received $A_i$ value (in this case $A_2$) plus a predetermined fraction (1/q) of the difference $\Delta_i$ between the two preceding received first digital words $A_{i-1}$ and $A_{i-2}$, in this case $A_1$ and $A_2$. This extrapolation is continued until a digital word $A_i$ is received (in this case $A_3$) in the interval 34 prior to the value of $B_i$ being generated.

This is not a linear extrapolation insofar as the algorithm requires no knowledge of timing of receipt of digital words $A_{i-1}$ and $A_{i-2}$. Further, the transmission rate of the first digital words $A_i$ need not be synchronous with the generation rate of the second digital words $B_i$.

Referring now to FIGS. 2 and 3, a current digital word $A_i$ may be received by the network module 30 within a given interval 34 before the generation of a digital word $B_i$. If so, it is connected directly to a filter section 36 indicated schematically by the operation of a switch 38 which switches to receive the incoming digital word $A_i$.

If a digital word $A_i$ is not received within the interval 34, however, then the filter section 36 receives a synthesized value formed from the difference $\Delta_i$ between the previous first digital word $A_{i-1}$, and the first digital word preceding the previous digital word: $A_{1-2}$, the difference $\Delta_i$ produced by subtraction block 40. This difference $\Delta_i$ is multiplied by a scaling factor 1/q as indicated by scaling block 42 and summed to the preceding first digital word $A_{i-1}$.

Figure 4:
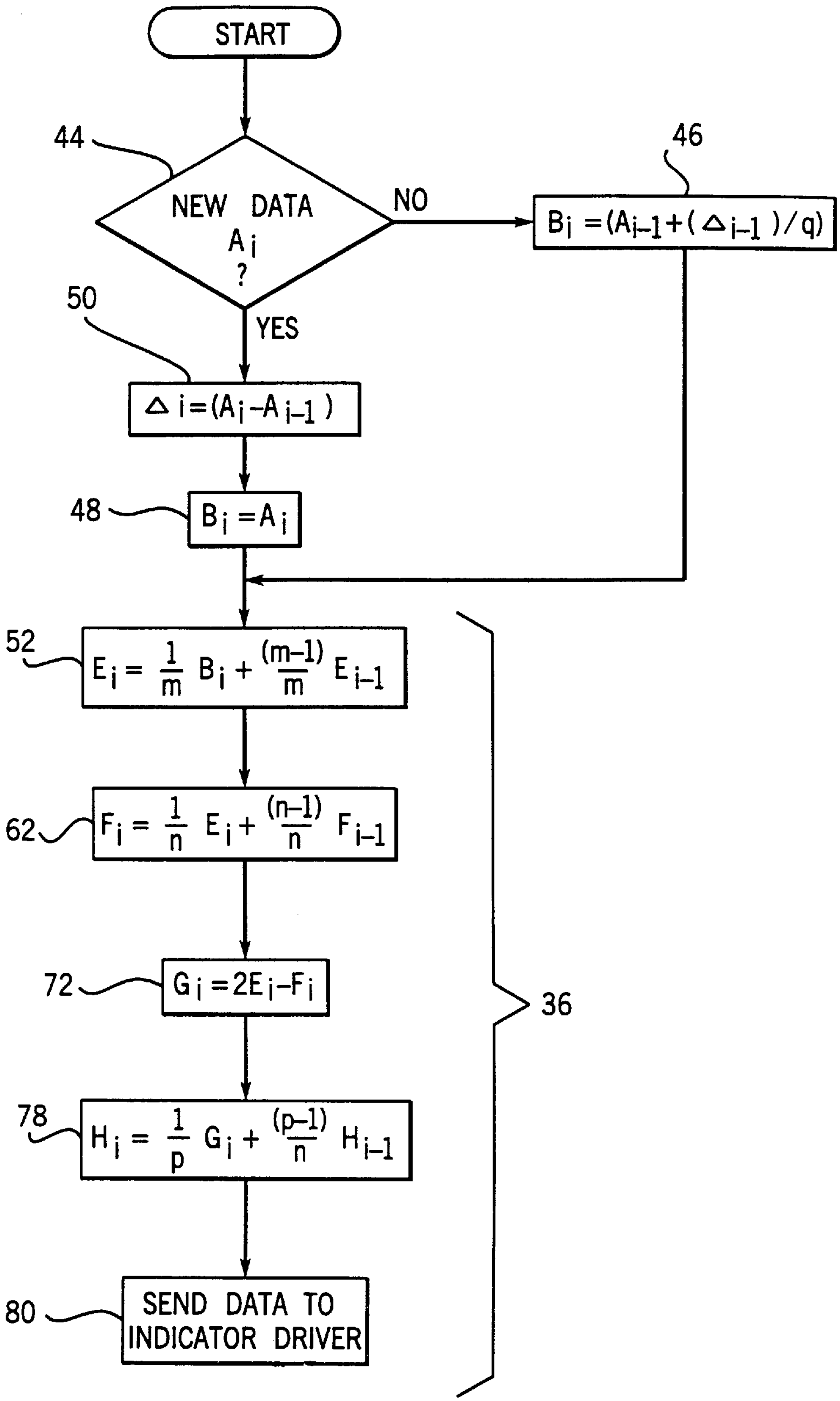
FIG. 4 is a flow chart showing the steps of the present invention as may be realized by an electronic processor executing a stored program.

This same process is shown in the flow diagram of FIG. 4, where the receipt of new data $A_i$ is detected at decision block 44. If a new data $A_i$ has arrived during the preceding interval 34, then the synthesized value $B_i$ is set equal to that value $A_i$ as shown in process block 48 and a new $\Delta_1$ value is computed for $\Delta_i=(A_i-A_{i-1})$ as indicated by process block 50. If at decision block 44, no new data $A_i$ is detected within the interval 34, then the second digital word $B_i$ is synthesized from the value $A_{i-1}+\Delta_{i-1}/q$ as indicated by process block 46.

Thus, as shown in FIG. 2, a new value $B_3$ may be generated from the previous value of $A_2$ (not falling within the interval 34 preceding $B_3$) plus a difference value $\Delta_2/q$ indicating generally the trend of data in the last two digital words $A_1$ and $A_2$.

In this way, for example, during a period of acceleration, a speedometer will move upward smoothly in speed even without the presence of a new digital word. Similarly, if the speed is constant and the $\Delta$ value is zero, a uniform speed will be displayed despite the irregularity in the first digital words.

Referring again to FIGS. 3 and 4, once the extrapolated value $B_i$ is obtained, it may be filtered in a set of filter steps (blocks 52, 62, 72 and 78 of FIG. 4) or by a set of filter stages (blocks 52', 62', 72' and 78' of FIG. 3) which serve generally to smooth out rapid changes in the value $B_i$ received or generated. As will be seen, the filters may be adjusted to provide the desired trade-off between a highly responsive display that shows changes in $B_i$ values as they occur and which may be desirable so that the operator of the vehicle has immediate access to the latest data and a filtered display that prevents overshooting and minor fluctuations and that may thereby accommodate slight irregularities produced by the estimation process of the present invention.

Referring to FIG. 3, first filter stage 52' creates values $E_i$ that are the weighted sum of a previous value $E_{i-1}$ and the latest generated value $B_i$. This is shown schematically in FIG. 3 by multiplier 54 scaling the received $B_i$ value by 1/m and summing it at summing block 56 with the previous value $E_{i-1}$ stored at memory 57 times the factor (m−1)/m per multiplier 60.

Referring again to FIG. 4, this same step is shown by process block 52 in which values of $E_i$ are generated equal to $(1/m)B_i+((m-1)/m)\ E_{i-1}$.

Referring to FIG. 3, a second filter stage 62' receives the values $E_i$ to create second filtered values $F_i$ that are the weighted sum of a previous value $F_{i-1}$ and the latest generated value $E_i$. This is shown schematically in FIG. 3 by multiplier 64 scaling the received $E_i$ value by 1/n and summing it at summing block 66 with the previous value $F_{i-1}$ stored at memory 68 times the factor (n−1)/n per multiplier 70.

Referring to FIG. 4, this same step is shown by process block 62 in which values of $E_i$ are generated equal to $(1/n)E_i+((n-1)/n)\ F_{i-1}$.

Referring again to FIG. 3, a value $G_i$ may be generated being proportional to Ei and inversely proportional to F according to the formula $Gi=2E_i-F_i$. This summation is shown by summing block 74 receiving a scaled value of $E_i$ through multiplier 76. The purpose of this process block is to de-emphasize rapid changes in the display value and thereby to prevent overshoot of the displayed value. This process is indicated in FIG. 3 as block 72 and in FIG. 4 as step 72.

Referring again to FIG. 3, the value $G_i$ is again filtered in a manner similar to that of blocks 52' and 62' as shown by block 78' in which prescaler 80 multiplies the value of $G_i$ by 1/p followed by summing block 82 adding the value of $H_{i-1}$ stored at memory 84 after being scaled by (p−1)/p by scaler 86.

This same step is shown in FIG. 4 as process block 78' in which values $H_i$ are generated equal to $(1/p)G_i+((p-1)/p)\ H_{i-1}$. This last filter stage provides additional smoothing of data that is sent to the display 28 as indicated in FIG. 4 as process block 80.

Each of the values m, n, and p may be individually adjusted to provide the desired filtering tradeoff for a particular vehicle and type of data.

The above description has been that of a preferred embodiment of the present invention, and it will occur to those that practice the art that many modifications may be made without departing from the spirit and scope of the invention. In order to apprise the public of the various embodiments that may fall within the scope of the invention, the following claims are made.

I claim:

1. A display system for a vehicle comprising:

a time multiplexed data communication network;

a data sender attached to the communication network and communicating with a physical object to transmit on the communications network on an irregular time interval a series of first digital words representing a measurement of the physical object;

a data receiver receiving the first digital words on the irregular time interval and producing second digital words on a periodic interval, the second digital words having value extrapolated from the first digital words; and a display receiving the second digital words and providing a human readable display of the data of the second digital words.

2. The display system of claim 1 wherein the data receiver operates according to a stored program to extrapolate a current second digital word from the first digital words by:

(i) calculating a difference between a previous first digital word prior to the current second digital word and a preceding first digital word prior to the previous first digital word; and (ii) set the current second digital to a value equal to a sum of a portion of the difference and the previous first digital word.

3. The display system of claim 2 wherein the portion is a predetermined constant fraction.

4. The display system of claim 2 wherein the data receiver includes a timer generating a periodic interrupt signal and a microprocessor responding to the periodic interrupt signal to extrapolate a current second digital word.

5. The display system of claim 1 wherein the data receiver further provides a filtering of the rate of change with time of the second digital words prior to their receipt by the display system.

6. The display system of claim 5 wherein the data receiver is an electronic processor and operates according to a stored program to filter the rate of change with time of the second digital words by creating a series of current filtered second digital words, each current filtered second digital word equal to the sum of a current second digital word times 1/m and a previous filtered second digital word prior to the current filtered second digital word times (m−1)/m where m is an arbitrary factor controlling the amount of filtering.

7. The display system of claim 6 wherein the data receiver is an electronic processor and operates according to a stored program to filter the rate of change with time of the second digital words by creating a series of current twice-filtered second digital words, each current twice filtered second digital word equal to the sum of a current filtered second digital word times 1/n and a previous twice-filtered second digital word prior to the current filtered second digital word times (n−1)/n where n is an arbitrary factor independent of m controlling the amount of filtering.

8. The display system of claim 7 wherein the data receiver operates according to a stored program to filter the rate of change with time of the second digital words by creating a series of blended filtered second digital words each being a combination in predetermined proportion of the current filtered second digital words and the current twice filtered second digital words.

9. The display system of claim 8 wherein the data receiver operates according to a stored program to filter the rate of change with time of the second digital words by creating a series of current thrice filtered second digital words, each current thrice filtered second digital word equal to the sum of a current blended second digital word times 1/p and a previous blended second digital word prior to the current filtered second digital word times (p−1)/p where p is an arbitrary factor controlling the amount of filtering.

10. The display system of claim 1 wherein the data senders detect rotation rate of a physical object selected from the group consisting of a vehicle engine and a vehicle wheel.

11. The display system of claim 1 wherein the data sender includes a microprocessor transmitting the first digital words as a pre-emptable task.

12. A method of transmitting and displaying vehicle data transmitted on an irregular interval over a time multiplexed data communication network comprising the steps of:

measuring a physical object of the vehicle to produce a series of first digital words indicating a measurement of the physical object;

transmitting the first digital words over the communications network on an irregular time interval;

receiving the irregularly transmitted first digital words from the communications network at a data receiver and producing second digital words on a periodic interval, the second digital words having values extrapolated from the first digital words; and receiving the second digital words at a display providing a human readable display of the data of the second digital words.

13. The method of claim 12 extrapolating a current second digital word from the first digital words further includes the steps of:

(i) calculating a difference between a previous first digital word prior to the current second digital word and a preceding first digital word prior to the previous first digital word; and (ii) set the current second digital to a value equal to a sum of a portion of the difference and the previous first digital word.

14. The method of claim 13 wherein the portion is a predetermined constant fraction.

15. The method of claim 12 including the step of limiting the rate of change with time of the second digital words prior to their receipt by the display.

16. The method of claim 15 wherein the step of limiting the rate of change with time of the second digital words creates a series of current filtered second digital words, each current filtered second digital word equal to the sum of a current second digital word times 1/m and a previous filtered second digital word prior to the current filtered second digital word times (m−1)/m where m is an arbitrary factor controlling the amount of filtering.

17. The method of claim 16 further including the step of creating a series of current twice-filtered second digital words, each current twice filtered second digital word equal to the sum of a current filtered second digital word times 1/n and a previous twice-filtered second digital word prior to the current filtered second digital word times (n−1)/n where n is an arbitrary factor independent of m controlling the amount of filtering.

18. The method of claim 17 further including the step of creating a series of blended filtered second digital words each being a combination in predetermined proportion of the current filtered second digital words and the current twice filtered second digital words.

19. The method of claim 18 further including the step of creating series of current thrice filtered second digital words, each current thrice filtered second digital word equal to the sum of a current blended second digital word times 1/p and a previous blended second digital word prior to the current filtered second digital word times (p−1)/p where p is an arbitrary factor controlling the amount of filtering.

20. The method of claim 12 wherein the data senders detect rotation rate of a physical object selected from the group consisting of a vehicle engine and a vehicle wheel.

* * * * *

UNITED STATES PATENT AND TRADEMARK OFFICE

CERTIFICATE OF CORRECTION

PATENT NO. : 6,216,062 B1
DATED : April 10, 2001
INVENTOR(S) : Terry Thomas Cwik et al.

It is certified that error appears in the above-identified patent and that said Letters Patent is hereby corrected as shown below:

Column 1,
Line 48, "limes" should be -- times --.
Line 61, "receive" should be -- receives --.

Column 2,
Line 42, "time," should be -- times --.

Column 6, claim 1,
Line 12, "value" should be -- values --.

Signed and Sealed this

Eighth Day of January, 2002

*Attest:*

JAMES E. ROGAN

*Attesting Officer* *Director of the United States Patent and Trademark Office*